United States Patent
Sugihara et al.

(10) Patent No.: US 9,362,055 B2
(45) Date of Patent: Jun. 7, 2016

(54) METHOD FOR MANUFACTURING SOLID ELECTROLYTIC CAPACITOR

(75) Inventors: Ryosuke Sugihara, Osaka (JP); Kei Hirota, Osaka (JP)

(73) Assignee: TAYCA CORPORATION, Osaka-shi (JP)

( * ) Notice: Subject to any disclaimer, the term of this patent is extended or adjusted under 35 U.S.C. 154(b) by 211 days.

(21) Appl. No.: 14/116,689

(22) PCT Filed: May 10, 2012

(86) PCT No.: PCT/JP2012/061936
§ 371 (c)(1),
(2), (4) Date: Nov. 8, 2013

(87) PCT Pub. No.: WO2012/153790
PCT Pub. Date: Nov. 15, 2012

(65) Prior Publication Data
US 2014/0078645 A1   Mar. 20, 2014

(30) Foreign Application Priority Data

May 12, 2011   (JP) .................................. 2011-106793

(51) Int. Cl.
| H01G 9/00 | (2006.01) |
| H01G 9/028 | (2006.01) |
| H01G 9/15 | (2006.01) |

(52) U.S. Cl.
CPC ........... *H01G 9/0029* (2013.01); *H01G 9/0036* (2013.01); *H01G 9/028* (2013.01); *H01G 9/15* (2013.01); *Y10T 29/417* (2015.01)

(58) Field of Classification Search
None
See application file for complete search history.

(56) References Cited

U.S. PATENT DOCUMENTS

| 5,694,287 A | 12/1997 | Nishiyama et al. |
| 2006/0084237 A1 | 4/2006 | Kobayashi |

FOREIGN PATENT DOCUMENTS

| JP | 03-036531 A | 2/1991 |
| JP | 08-078292 A | 3/1996 |
| JP | 2003-022937 A | 1/2003 |
| JP | 2003-142343 A | 5/2003 |
| JP | 2003-160647 A | 6/2003 |
| JP | 2004-265927 A | 9/2004 |
| JP | 2006-140443 A | 6/2006 |

OTHER PUBLICATIONS

Hana et al., English Translation JP2003142343.*
International Search Report dated Aug. 14, 2012, issued in corresponding application No. PCT/JP2012/061936.

\* cited by examiner

*Primary Examiner* — Seahvosh Nikmanesh
(74) *Attorney, Agent, or Firm* — Westerman, Hattori, Daniels & Adrian, LLP

(57) ABSTRACT

There is provided a method to provide a capacitor element including a porous body of a valve metal, and a dielectric layer of an oxide layer of the valve metal. The method includes a first sequential process, and a second sequential process. The first sequential process includes: immersing the capacitor element in a first liquid of dispersion of a conductive polymer obtained by means of oxidation polymerization of thiophene or its derivative in the presence of a dopant of a polymer anion; taking out the capacitor element from the first liquid; and drying the capacitor element. Subsequent second sequential process includes: immersing the capacitor element in a second liquid which dissolves a cyclic organic compound having at least one hydroxyl group; taking out the capacitor element from the second liquid; and drying the capacitor element.

12 Claims, No Drawings

METHOD FOR MANUFACTURING SOLID ELECTROLYTIC CAPACITOR

TECHNICAL FIELD

This invention relates to a method for manufacturing a solid electrolytic capacitor using a conductive polymer as solid electrolyte.

BACKGROUND OF THE INVENTION

For example, the conductive polymer is highly conductive, and therefore, it is used as a solid electrolyte of a solid electrolytic capacitor such as tantalum solid electrolytic capacitor, aluminum solid electrolytic capacitor, and niobium solid electrolytic capacitor.

For example, the conductive polymer used in this application can be obtained through chemical oxidation polymerization or electrolytic oxidation polymerization of thiophene or its derivatives.

In carrying out the chemical oxidation polymerization of thiophene or its derivatives above, an organic sulfonic acid can be usually used as a dopant. In particular, it is known that an aromatic sulfonic acid is suitable. As an oxidant, a transition metal is used. In particular, it is known that ferric compound is suitable. Usually, a ferric salt of an aromatic sulfonic acid can be used to serve as a dopant and oxidant in the chemical oxidation polymerization of thiophene or its derivatives.

Among the ferric salts of the aromatic sulfonic acid, following reports are there. Particularly useful are ferric toluenesulfonate and ferric methoxybenzene sulfonate. In order to synthesize a conductive polymer using them, they are used as a dopant and oxidant, while being mixed with a polymerizable monomer such as thiophene or its derivatives. These processes are simple and suitable for the industrialization (see patent reference No. 1, and patent reference No. 2, below).

However, when a conductive polymer was obtained by using ferric toluenesulfonate serving as an oxidant and dopant, it did not attain the characteristics fully satisfying the initial resistance value and the heat resistance value. Also, when a conductive polymer was obtained by using ferric methoxybenzene sulfonate as an oxidant and dopant, an improvement was found compared with the conductive polymer using the ferric toluenesulfonate, in that the initial resistance value was lowered and the heat resistance was improved; however, it still did not reach the characteristics that could be fully satisfied.

The reasons of the results above are because ferric toluenesulfonate and ferric methoxybenzene sulfonate are solids, so that they are usually used in a state of solution in an alcohol. However, the solution produces precipitations during storage.

That is, when using an alcohol solution of ferric toluenesulfonate or ferric methoxybenzene sulfonate, producing precipitations, uniformity can be deteriorated. Therefore, when solid electrolytic capacitors are prepared by using such conductive polymers, ESR (equivalent series resistance) can be increased, and the reliability under a hot condition can be decreased.

In addition, when thereby obtained conductive polymer is used as a solid electrolyte of a solid electrolytic capacitor, the following issues have to be considered. That is, a conductive polymer obtained by means of a chemical oxidation polymerization method is usually not soluble in a solvent, and therefore, it is necessary to form a layer of the direct conductive polymer directly on an element. The element here includes: a positive electrode of a porous body made of a valve metal such as aluminum, tantalum and niobium; and a dielectric layer made of an oxide film of that valve metal.

However, the formation of the conductive polymer directly on the element requires working under a condition that is very complicated. Therefore, its reproducibility was poor, and the process control was very difficult.

Considering the situations above, there has been variously considered soluble conductive polymers (see patent reference No. 3). Patent reference No. 3 reports that a dispersion liquid of a conductive polymer can be obtained from mixture and reaction from polystyrene sulfonic acid, ammonium persulfate, an iron salt, and ethylenedioxy thiophene. However, thereby obtained conductive polymer did not have enough conductivity, and therefore, further improvement of the conductivity is required in order to use it as a solid electrolyte of a solid electrolytic capacitor.

PRIOR ART REFERENCES

Patent References

Patent Reference No. 1: Japanese Laid-Open Patent Publication No. 2003-160,647

Patent Reference No. 2: Japanese Laid-Open Patent Publication No. 2004-265,927

Patent Reference No. 3: Japanese Patent No. 2,636,968

SUMMARY OF THE INVENTION

The Objectives to Solve by the Invention

In view of the circumstances described above, the objective of the present invention is to provide a solid electrolytic capacitor in which the ESR is low (i.e., small), the voltage resistance is high, and the charge discharge characteristic is excellent.

Means to Solve the Problem

The present application provides a method for manufacturing a solid electrolytic capacitor using a conductive polymer as a solid electrolyte. The method comprises providing a capacitor element including a porous body of a valve metal, and a dielectric layer of an oxide layer of the valve metal, wherein the valve metal is selected from the group consisting of aluminum, tantalum and niobium. The method comprises carrying out at least one time a first sequential process to form a layer of a conductive polymer. The first sequential process comprises: immersing the capacitor element in a first liquid of dispersion of a conductive polymer obtained by means of oxidation polymerization of thiophene or its derivatives in the presence of a polymer anion as a dopant; taking out the capacitor element from the first liquid; and drying the capacitor element. Subsequently, the method carries out a second sequential process at least one time. The second sequential process comprises: immersing the capacitor element in a second liquid which dissolves a cyclic organic compound having at least one hydroxyl group; taking out the capacitor element from the second liquid; and drying the capacitor element. Carrying out the inventive method above, a solid electrolytic capacitor can be obtained while the ESR becomes low (i.e., small), the voltage resistance becomes high, and the charge discharge characteristic becomes excellent.

Effect of the Invention

According to the present invention, a solid electrolytic capacitor can be obtained while the ESR is low, the voltage resistance is high, and the charge discharge characteristic is excellent.

EMBODIMENTS TO CARRY OUT THE INVENTION

As described above, according to the present invention, the solid electrolytic capacitor is produced through the process in which the capacitor element having formed the conductive polymer is immersed in a solution dissolving the cyclic organic compound having at least one hydroxyl group. The cyclic organic compound having at least one hydroxyl group can be aromatic, heterocyclic, or alicyclic.

Also, the cyclic organic compound having at least one hydroxyl group above can be preferably an aromatic compound. Among the aromatic compounds, particularly useful are benzene compounds, naphthalene compounds, and anthracene compounds.

The examples of the aromatic compounds useful as the cyclic organic compound having at least one hydroxyl group can include: phenol, cresol, nitrophenol, aminophenol, hydroxybenzoic acid (i.e., hydroxybenzene carboxylic acid), sulfosalicylic acid, dihydroxybenzene, dihydroxybenzoic acid (i.e., dihydroxybenzene carboxylic acid), hydroxybenzoate methyl (i.e., hydroxybenzene carboxylate methyl), hydroxybenzoate ethyl (i.e., hydroxybenzene carboxylate ethyl), hydroxybenzoate ethyl hexyl (i.e., hydroxybenzene carboxylate ethyl hexyl), methoxyphenol, ethoxyphenol, butoxyphenol, phenylphenol, cumyl phenol, amino nitrophenol, hydroxy nitrobenzoic acid (i.e., hydroxy nitrobenzene carboxylic acid), hydroxy nitrobenzoate methyl (i.e., hydroxyl nitrobenzene carboxylate methyl), sulfone salicylic acid, dihydroxybenzene, dihydroxybenzoic acid (i.e., dihydroxybenzene carboxylic acid), trihydroxybenzene, trihydroxybenzoic acid (i.e., trihydroxybenzene carboxylic acid), phenolsulfonic acid, cresol sulfonic acid, dihydroxybenzene sulfonic acid, nitro phenolsulfonic acid, and hydroxy indole.

The examples of the naphthalene compounds can include naphthol, nitro naphthol, hydroxynaphthoic acid (i.e., hydroxynaphthalene carboxylic acid), dihydroxy naphthol, trihydroxy naphthol, naphtholsulfonic acid, dihydroxy naphtholsulfonic acid, and nitro naphtholsulfonic acid.

The examples of the anthraquinone compounds can include hydroxyanthraquinone.

The examples of the heterocyclic compounds as the cyclic organic compound having at least one hydroxyl group can include 2,5-dicarboxy-3,4-dihydroxythiophene, 3-hydroxythiophene, 3,4-dihydroxythiophene, hydroxypyridine, and dihydroxypyridine.

The examples of the alicyclic compounds can include hydroxy cyclohexane, hydroxy cyclohexane carboxylic acid, hydroxy cyclohexane carboxylate methyl, and dihydroxycyclohexane.

Among these cyclic organic compounds, a compound having only one hydroxyl group is particularly useful.

In addition, each of the cyclic organic compounds having at least one hydroxyl group can be used alone, or in combination of two or more, and in particular, it is preferable to use two compounds together.

As the cyclic organic compound having at least one hydroxyl group, a compound having at least one carboxyl group is preferable. Hydroxybenzoic acid and hydroxynaphthoic acid are the examples of the cyclic organic compound having at least one hydroxyl group which also satisfy the condition to require at least one carboxyl group as mentioned above.

Also, as the cyclic organic compound having at least one hydroxyl group, a compound having at least one nitro group is preferable. For example, nitrophenol, nitro phenolsulfonic acid, nitro naphthol, and nitro naphtholsulfonic acid are the examples of the cyclic organic compound having at least one hydroxyl group which also satisfy the condition to require at least one nitro group as mentioned above.

Also, the phrase "having at least one hydroxyl group" in the context of the cyclic organic compound having at least one hydroxyl group means that it can include only one hydroxyl group, or that it may include two or more hydroxyl groups. Also, the phrase "having at least one carboxyl group" in the context of the cyclic organic compound having at least one hydroxyl group and further having at least one carboxyl group means that it can include only one carboxyl group, or that it may include two or more carboxyl groups. Also, the phrase "having at least one nitro group" in the context of the cyclic organic compound having at least one hydroxyl group and further having at least one nitro group means that it can include only one nitro group, or that it may include two or more nitro groups.

The cyclic organic compound having at least one hydroxyl group as mentioned above can reduce the ESR and improve the charge discharge properties of solid electrolytic capacitors when the conductive polymer is used as a solid electrolyte including a polymer anion as a dopant.

In preparing a solution of the cyclic organic compound having at least one hydroxyl group as mentioned above, the followings can be considered. That is, the cyclic organic compound having at least one hydroxyl group mentioned above is not easy to dissolve in water. Thus, when an aqueous solution is prepared; further additives can be included. The examples of such additives are: a lower amine compounds such as dimethylamine, methylamine, trimethylamine, diethylamine, dimethylamine, triethylamine, and ethylene diamine; a basic substance such as ammonia, imidazole, methyl imidazole, methyl ethyl imidazole, and methyl butyl imidazole; and an aminosilane compound such as aminopropyl trimethoxy silane, aminopropyl triethoxy silane, and N-phenyl-γ-aminopropyl trimethoxy silane.

By adding the additives above, the cyclic organic compound having at least one hydroxyl group can be favorably dissolved in water.

In addition, when the cyclic organic compound having at least one hydroxyl group as mentioned above is dissolved in a lower alcohol having a lower boiling point, such as methyl alcohol and ethyl alcohol, it is possible that the lower amine compound above, the basic substance above, the aminosilane compound above can be added in order to make it easy to dissolve the cyclic organic compound.

The concentration of the cyclic organic compound having at least one hydroxyl group in the solution is not particularly limited, but it can be preferably 0.1-80 mass %. In the range above, it can be more preferably 1 mass % or more, and 10 mass % or less.

When the concentration of the cyclic organic compound having at least one hydroxyl group is in the range of 0.1-80 mass % in a solution, the following advantages can be found. That is, after forming a layer of the conductive polymer (which can be hereinafter referred to as "the conductive polymer layer" for simplification) on the capacitor element, it cannot be necessarily to increase the number of the steps to immerse it into the solution including the cyclic organic compound having at least one hydroxyl group. In addition, the deterioration of the workability drop due to the excess increase of the viscosity can be hardly caused.

The pH value of the solution of the cyclic organic compound having at least one hydroxyl group as mentioned above is not particularly limited, but its pH value can be in the range of 1 to 11. When the pH value is higher than 11, de-doping of the conductive polymer can be caused due to the alkali condition. When the pH value is lower than 1, the oxide layer of the capacitor element can be damaged, and therefore, leakage currents might increase.

When the capacitor element having formed the conductive polymer layer is immersed in a solution of the cyclic organic compound having at least one hydroxyl group mentioned above, and takes it out and dried, the following can occur. The cyclic organic compound having at least one hydroxyl group can be mostly in the form of a thin film on the conductive polymer layer. However, when it is in a solution state, it can partly spread inside the conductive polymer layer, and being dried there. Therefore, it is considered that the cyclic organic compound having at least one hydroxyl group is partly incorporated inside the conductive polymer layer.

The amount of the cyclic organic compound having at least one hydroxyl group can be 1 to 5000 mass % with respect to the conductive polymer (i.e., 1 to 5000 mass parts of the cyclic organic compound having at least one hydroxyl group is included with respect to 100 mass parts of the conductive polymer). In the range above, it can be preferably 20 mass % or more, and 500 mass % or less.

It is preferable that the solution of the cyclic organic compound having at least one hydroxyl group above includes a solvent having a high boiling point. This is because when the solution of the cyclic organic compound having at least one hydroxyl group above includes such a solvent having a high boiling point, the film production property of the cyclic organic compound having at least one hydroxyl group can be improved. As a result, the ESR can be lowered, and the voltage resistance property can be further improved.

The solvent having a high boiling point can preferably have a boiling point of 150° C. or more. The examples of such a solvent having a high boiling point can be butanediol (boiling point=230° C.), dimethylsulfoxide (boiling point=189° C.), gamma-butyrolactone (boiling point=204° C.), sulfolane (boiling point=285° C.), N-methylpyrrolidone (boiling point=202° C.), dimethylsulfone (boiling point=233° C.), ethylene glycol (boiling point=198° C.), diethylene glycol (boiling point=244° C.), and polyethylene glycol. In particular, butanediol and dimethylsulfoxide are preferable.

It is noted that some kinds of polyethylene glycols do not have a boiling point under the normal pressure, like polyethylene glycol 600 and polyethylene glycol 1500 (here, the number just after the term "polyethylene glycol" refers to its molecular weight). However, no kinds of polyethylene glycols have a boil at a temperature of 150° C. or less under the normal pressure. In the present invention, therefore, polyethylene glycols shall be regarded as being included as a group of the solvents having a high boiling point.

In addition, the quantity of the solvent having a high boiling point to be added can be preferably 5 to 3000 mass % with respect to the cyclic organic compound having at least one hydroxyl group (i.e., 5-3000 parts by mass of the solvent having a high boiling point are added with respect to 100 parts by mass of the cyclic organic compound having at least one hydroxyl group). In the range above, it can be preferably 20 mass % or more, and 700 mass % or less.

When the quantity of the solvent having a high boiling point is more than the range above, a part of the conductive polymer can dissolve or swell when the capacitor element having formed the conductive polymer layer is then immersed in the solution of the cyclic organic compound having at least one hydroxyl group. Then, when it is dried, the conformation (i.e., structure) can be changed, thereby decreasing the conductivity of the conductive polymer. As a result, it can cause the increase of the ESR of the solid electrolytic capacitor as well as the decrease of the voltage resistance. In addition, when the quantity of the solvent having a high boiling point is more than the range above, it can take more time to carry out the drying of the solution. Also, it can cause the increase of the ESR due to the heat history.

Furthermore, it is favorable that the solution of the cyclic organic compound having at least one hydroxyl group above can include a binders such as 3-glycidoxypropyltrimethoxysilane, polyethylene glycol diglycidyl ether, diethylene glycol glycidyl, and glycidyl methacrylate. This can increase the action to improve the voltage resistance of the solid electrolytic capacitor by incorporating such a binder in the liquid as mentioned above.

The quantity of the binder can be preferably 0.1 to 1000 mass % with respect to the solution of the cyclic organic compound having at least one hydroxyl group (namely, 0.1 to 1000 parts by mass of the binder can be added with respect to 100 parts by mass of the cyclic organic compound having at least one hydroxyl group).

In the range above, it can be preferably 10 mass % or more, and 300 mass % or less.

Next, described is the capacitor element as well as the dispersion liquid of the conductive polymer including a polymer anion as dopant.

First, the capacitor element is explained. In the present invention, the capacitor element includes: a porous body made of at least one valve metal selected from the group consisting of aluminum, tantalum and niobium; and a dielectric layer made of an oxide layer of the valve metal above. Such a structure is a basic constitution common to capacitor elements used in an aluminum solid electrolytic capacitor, tantalum solid electrolytic capacitor, and niobium solid electrolytic capacitor. A specific structure of the capacitor element is not intended. Such a capacitor element can be applied into any of solid electrolytic capacitors such as aluminum solid electrolytic capacitor, tantalum solid electrolytic capacitor, niobium solid electrolytic capacitor.

For example, a positive electrode includes the porous body made of the valve metal, at least one surface of which has formed a dielectric layer of an oxide layer of the valve metal. The positive electrode and a negative electrode are wound or laminated with interposition of a separator, thereby forming a capacitor element. Alternatively, a capacitor element has a positive electrode composed of a porous body of the valve metal above and a dielectric layer made of an oxide layer of the valve metal above. As a negative electrode of the solid electrolytic capacitor, a conductive polymer layer to become a solid electrolyte is formed; and then, a carbon layer and a silver paint layer are sequentially formed.

In the present invention, the dispersion liquid of the conductive polymer is a dispersion liquid of a conductive polymer obtained by oxidation polymerization of thiophene or its derivatives, serving a polymer anion as a dopant.

As the polymer anion above, preferable is a polymer sulfonic acid or a polymer carboxylic acid. In particular, a polymer sulfonic acid is preferable. In addition, the example of the polymer sulfonic acid can be at least one of polystyrene sulfonic acid, sulfonated polyester, and phenolsulfonic acid novolac resin having a repeat unit represented by formula (1).

Formula 1:

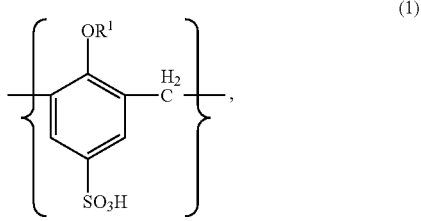

(1)

where in the formula (1), $R^1$ is hydrogen or a methyl group.

The theory of the invention is considered as follow. That is, the polymer sulfonic acid above functions as a superior dispersant at the time of synthesis of the conductive polymer. It can also make the oxidant and the monomer such as thiophene or its derivatives uniformly disperse in water or aqueous liquid. In addition, it can be incorporated into the synthesized polymer as a dopant. As a result, it can be appropriately used as a solid electrolyte of the solid electrolytic capacitor having a high conductivity. Also, by functioning the polymer sulfonic acid as a superior dispersant, the conductive polymer can be suitably used as a solid electrolyte of the solid electrolytic capacitor having excellent heat resistance.

If using the polystyrene sulfonic acid above, its weight average molecular weight can be preferably 10,000 to 1,000,000.

Namely, when the weight average molecular weight of the polystyrene sulfonic acid above is smaller than 10,000, thereby obtained conductive polymer might have a low conductivity. By contrast, when the weight average molecular weight of the polystyrene sulfonic acid above is larger than 1,000,000, the dispersion liquid of the conductive polymer might have a high viscosity, and therefore, it may become difficult to handle it in the production of the solid electrolytic capacitor. In addition, among the range above, the weight average molecular weight of the polystyrene sulfonic acid can be preferably 20,000 or more, and particular, 40,000 or more. Also, it can be preferably 800,000 or less, and in particular, 300,000 or less.

Also, the sulfonated polyester above can be obtained by condensation polymerization from dicarboxybenzene sulfonate diester such as sulfoisophthalate ester and sulfoterephthalate ester, and alkylene glycol in the presence of a catalyst such as antimony oxide or zinc oxide. The weight average molecular weight of the sulfonated polyesters can be preferably 5,000 to 300,000.

Namely, when the weight average molecular weight of sulfonated polyester is lower than 5,000, thereby obtained conductive polymer might have a low conductivity. When the weight average molecular weight of the sulfonated polyester is larger than 300,000, the dispersion liquid of the conductive polymer might have a high viscosity, and therefore, it may become difficult to handle it in the production of the solid electrolytic capacitor. In addition, within the range mentioned above, the weight average molecular weight of the sulfonated polyester can be preferably 10,000 or more, and in particular, 20,000 or more. Also, it can be preferably 100,000 or less, and in particular, 80,000 or less.

Also, the phenolsulfonic acid novolac resin above has a repeat unit represented by formula (1). The weight average molecular weight of the phenolsulfonic acid novolac resin can be preferably 5,000-500,000.

Namely, when the weight average molecular weight of the phenolsulfonic acid novolac resin above is smaller than 5,000, thereby obtained conductive polymer might be low in the conductivity. By contrast, when the weight average molecular weight of the phenolsulfonic acid novolac resin above is larger than 500,000, the viscosity of the dispersion liquid of the conductive polymer becomes high, thereby making it difficult in handling it in the production of the solid electrolytic capacitor. In addition, within the range mentioned above, the weight average molecular weight of the phenolsulfonic acid novolac resin can be preferably 10,000 or more; and it can be preferably 400,000 or less, and in particular, 80,000 or less.

These polystyrene sulfonic acid, sulfonated polyester, and phenolsulfonic acid novolac resin can be used alone or in combination of two or more. The dispersion liquid of the conductive polymer used in the present invention can be either one of the followings: The dispersion liquid of the complex conductive polymer can be synthesized by mixing the polymer sulfonic acid upon the synthesis of the conductive polymer. Alternatively, the polymer sulfonic acids above are used separately to prepare conductive polymers respectively, and after the synthesis of the conductive polymers, these dispersion liquids of these conductive polymers can be mixed together.

In the preparation of the dispersion liquid including the conductive polymer above, thiophene or its derivatives can be used as a monomer. The example of the thiophene derivatives can include 3,4-ethylenedioxy thiophene, alkyl derivatives of 3,4-ethylenedioxy thiophene, 3-alkylthiophene, 3-alkoxy thiophene, 3-alkyl-4-alkoxy thiophene, 3,4-alkylthiophene, and 3,4-alkoxy thiophene. Here, the alkyl group and alkoxy group can have a carbon number of 1 to 16. In particularly, 3,4-ethylenedioxy thiophene and its alkyl derivatives can be preferably used.

Detailed explanation is made for 3,4-ethylenedioxy thiophene and its alkyl derivatives. Hereinafter, while "3,4-" indicates the positions where oxygen atoms should coordinate, "3,4-ethylenedioxy thiophene" is simply referred to as "ethylenedioxy thiophene."

Ethylenedioxy thiophene or its alkyl derivatives correspond to the compound represented by Formula (2) below.

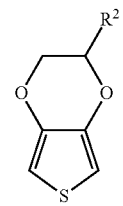

(2)

where in the formula, $R^2$ is hydrogen or an alkyl group.

Here, when $R^2$ in formula (2) above is hydrogen, it is ethylenedioxy thiophene. When it is expressed by the IUPAC name, it is 2,3-dihydro-thieno[3,4-b][1,4]dioxin (or 2,3-dihydro-thieno[3,4-b][1,4]dioxine). Since this compound is often expressed by common name, "ethylenedioxy thiophene," rather than the IUPAC name, this specification refers it as "ethylenedioxy thiophene" rather than "2,3-dihydro-thieno[3,4-b][1,4]dioxin." When $R^2$ in formula (2) above is an alkyl group, the alkyl group can have a carbon number of 1 to 4. In other words, it can be preferably methyl group, ethyl group, propyl group, or butyl group. Such compounds are exemplified in detail. when $R^2$ in formula (2) is methyl group, such a compound is, under the IUPAC name, "2-methyl-2,3-dihydro-thieno[3,4-b][1,4]dioxin" (or, 2-methyl-2,3-dihydrothieno[3,4-b][1,4]dioxine). In this specification, it is simply expressed by "methylated ethylenedioxy thiophene." When $R^2$ in formula (2) is ethyl group, such a compound is expressed under the IUPAC name as "2-ethyl-2,3-dihydro-thieno[3,4-b][1,4]dioxin" (or, 2-ethyl-2,3-dihydro-thieno[3,4-b][1,4]dioxine). In this specification, it is simplify referred to as "ethylated ethylenedioxy thiophene".

When $R^2$ in formula (2) is propyl group, such a compound is under the IUPAC name referred to as "2-propyl-2,3-dihydro-thieno[3,4-b][1,4]dioxin" (or, 2-propyl-2,3-dihydro-thieno[3,4-b][1,4]dioxine). In this specification, it is simplify called as "propylated thylenedioxy thiophene." When $R^2$ in formula (2) is butyl group, such a compound is under the IUPAC name referred to as "2-butyl-2,3-dihydro-thieno[3,4-b][1,4]dioxin" (or, 2-butyl-2,3-dihydro-thieno[3,4-b][1,4]dioxine). In this specification, it is simplify referred to as "butylated ethylenedioxy thiophene". Also "2-alkyl-2,3-dihydro-thieno[3,4-b][1,4]dioxin is simplify called as "alkylated ethylenedioxy thiophene" in this specification. Also, among these alkylated ethylenedioxy thiophene, preferable are methylated ethylenedioxy thiophene, ethylated ethylenedioxy thiophene, propylated thylenedioxy thiophene, and butylated ethylenedioxy thiophene. In particular, ethylated ethylenedioxy thiophene and propylated thylenedioxy thiophene are preferable. Also, the applicant of the present application has disclosed the method for synthesizing the alkylated ethylenedioxy thiophene in PCT/JP2010/70325 and PCT/JP2010/70759.

These ethylenedioxy thiophene and its alkyl derivatives (namely, alkylated ethylenedioxy thiophene) can be used alone or in combination of two or more.

Next, the explanation is made for the method to synthesize conductive polymer by means of oxidation polymerization of thiophene or its derivatives, using a polymer anion as a dopant. The polymer sulfonic acid such as the polystyrene sulfonic acid, the sulfonated polyester and the phenolsulfonic acid novolac resin as mentioned above is soluble to water, or an aqueous solution made of a mixture of water and water-miscible solvent. Therefore, the oxidation polymerization can be performed in water or such an aqueous solution.

As the water-miscible solvent constituting the aqueous solution above, the example can include methanol, ethanol, propanol, acetone, and acetonitrile. The mixing ratio of the water-miscible solvent with respect to water can be preferably 50% by mass or less.

The oxidation polymerization for preparing the conductive polymer can be either chemical oxidation polymerization or electrolytic oxidation polymerization.

As an oxidant to carry out the chemical oxidation polymerization, persulfates can be used. The example of the persulfates can include ammonium persulfate, sodium persulfate, potassium persulfate, calcium persulfate, and barium persulfate.

Regarding the chemical oxidation polymerization, the condition during the polymerization is not particularly limited. The temperature in the chemical oxidation polymerization can be preferably 5° C. to 95° C., and in more particular, it can be 10° C. to 30° C. The polymerization period can be preferably one hour to 72 hours, and in more particular, it can be eight hours to 24 hours.

The electrolytic oxidation polymerization can be carried out either in constant current or constant voltage. For example, when the electrolytic oxidation polymerization is performed in constant current, its current value can be preferably 0.05 mA/cm$^2$ to 10 mA/cm$^2$, and in particular, it can be 0.2 mA/cm$^2$ to 4 mA/cm$^2$. When the electrolytic oxidation polymerization is performed in constant voltage, its voltage can be preferably 0.5V to 10V, and in more particular, it can be 1.5V to 5V. The temperature in the electrolytic oxidation polymerization can be preferably 5° C. to 95° C., and in more particular, it can be 10° C. to 30° C. The polymerization period can be preferably one hour to 72 hours, and in more particular, it can be eight hours to 24 hours. In addition, upon the electrolytic oxidation polymerization, ferrous sulfate or ferric sulfate can be added as a catalyst.

Just after the polymerization as prepared above, the conductive polymer can be in a dispersion state in water or aqueous solution, including persulfate used as an oxidant, or an iron sulfate or its decomposition product used a catalyst. Therefore, the dispersion liquid of the conductive polymer including the impurities is supplied to a dispersion machine such as supersonic wave homogenizer or planet ball mill to disperse the impurities, thereby removing the metal compositions with a cation-exchange resin. At this time, the average particle size of the conductive polymer measured by means of dynamic light scattering can be preferably 10 nm or more, and in particular, it can be 100 nm or more. Also, it can be preferably 100 µm or less, and in particular, it can be 10 µm or less. Then, a process such as ethanol precipitation process, ultra-filtration process and anion exchange resin process is applied to remove the sulfuric acid formed by decomposition of the oxidant and the catalyst. A solvent having a high boiling point can be added if necessary.

As described above, when a solvent having a high boiling point is added in the dispersion liquid of the conductive polymer, the film formation property can be improved when drying the conductive polymer. Therefore, its conductivity can be improved. As a result, when it is used as a solid electrolyte of the solid electrolytic capacitor, the ESR can be lowered. The reasons are considered as follows. When producing a solid electrolytic capacitor, a capacitor element is immersed in the dispersion liquid of the conductive polymer, and then, it is taken out and dried. At this time, the solvent having a high boiling point can get away, as well. When the solvent having a high boiling point gets away here, the layer density can be increased in the thickness direction of the layer of the conductive polymer as formed. As a result, the surface dimension between the conductive polymers becomes small, thereby increasing the conductivity of the conductive polymer. Therefore, when it is used a solid electrolyte of the solid electrolytic capacitor, the ESR can be lowered.

As the solvent having a high boiling point included in the dispersion liquid of the conductive polymer, preferably is one with a boiling point of 150° C. or more. The specific example of such a solvent having a high boiling point can include butanediol (boiling point=230° C.), dimethylsulfoxide (boiling point=189° C.), gamma-butyrolactone (boiling point=204° C.), sulfolane (boiling point=285° C.), N-methylpyrrolidone (boiling point=202° C.), dimethylsulfone (boiling point=233° C.), ethylene glycol (boiling point=198° C.), diethylene glycol (boiling point=244° C.), and polyethylene glycol. In particular, butanediol and dimethylsulfoxide are preferable.

In addition, some kinds of the polyethylene glycols do not have a boiling point under the normal pressure, such as polyethylene glycol 600 and polyethylene glycol 1500. However, no polyethylene glycols can boil at a temperature of 150° C. or less under the normal pressure. Therefore, in the present invention, polyethylene glycols shall be regarded as being included as a group of the solvents having a high boiling point. Also, the content of the solvent having a high boiling point can be 5 to 3000 mass % with respect to the conductive polymer in the dispersion liquid (namely, 5 to 3000 parts by mass of the solvent having a high boiling point are included with respect to 100 parts by mass of the conductive polymer). Within the range mentioned above, the preferable range is 20 mass % or more, and 700 mass % or less.

Also, a binder resin can be added in the dispersion liquid including the conductive polymer in order to raise the adhesion between the capacitor element and the conductive polymer.

As the binder resin, the example can include polyurethane, polyester, acrylic acid resin, polyamide, polyimide, epoxy resin, polyacrylonitrile resin, polymethacrylonitrile resin, polystyrene resin, novolac resin, and a silane coupling agent. In particular, polyester, polyurethane, and acrylic acid resin can be used. Also, when a sulfone group is included like sulfonated polyallyl, sulfonated polyvinyl, and sulfonated polystyrene, the conductivity of the conductive polymer can be improved, so that it is more favorable.

The dispersion liquid of the conductive polymer used in the present invention can include the solvent having a high boiling point and the binder resin as explained above. However, in the present invention, the conductive polymer is an essential element to be included. Therefore, regardless of including the solvent having a high boiling point and the binder resin, the liquid is called as a dispersion liquid of the conductive polymer.

In the present invention, when preparing the solid electrolytic capacitor, a capacitor element is immersed in the dispersion liquid of the conductive polymer using a polymer anion as a dopant, and then, it is taken out and dried. The sequential process above is performed at least one time. As a result, a layer of the conductive polymer to become a solid electrolyte can be provided.

Here, "at least one time" above means only one time, or more than one time. In other words, it can be twice or more. Usually, it is suitable to obtain a desirable capacity as a capacitor, when repeating 2 to 3 times the sequential process of immersing it in the dispersion liquid of the conductive polymer mentioned, and taking it out and dried.

In the present invention, a capacitor element is immersed in the dispersion liquid of the conductive polymer using a polymer anion as a dopant, and then, it is taken out and dried, thereby forming a layer of conductive polymer on the capacitor element. The capacitor element is then immersed in the solution where a cyclic organic compound having at least one hydroxyl group is dissolved, and then, it is taken out and dried. The sequential process above is performed at least one time. As a result, a solid electrolytic capacitor can be produced.

Here, "at least one time" above means only one time, or more than one time. In other words, it can mean twice or more. Usually, one can perform only one time of the sequential process of immersing it into the solution of the cyclic organic compound having at least one hydroxyl group, taking it out, and drying it.

Through the process to immerse it into the solution of the cyclic organic compound having at least one hydroxyl group, solid electrolytic capacitor can be provided with a lowered ESR value, and an improved charge discharge property.

EXAMPLES

Next, the present invention is explained more in detail with reference to the examples. It is noted that the present invention is not narrowly construed to the examples. In addition, the percentages (%) for the concentration and the purity regarding the solution and the dispersion liquid are based on the mass standard unless otherwise noted. Prior to the explanation of the Examples, the Preparation Examples for the dispersion liquids of the conductive polymer are explained in Preparation Examples A to C. The Preparation Examples for the solution where a cyclic organic compound having at least one hydroxyl group is dissolved are explained in Preparation Example 1 to 28. The Preparation Examples of the solution where an organic compound other than the cyclic organic compound (i.e., cyclic organic compound having at least one hydroxyl group) are explained in Preparation Examples 29 to 32, which are used in Comparative Examples for the comparison with the cyclic organic compound having at least one hydroxyl group of the present invention.

Preparation Example A

The Dispersion Liquid of the Conductive Polymer 600 g of 4% aqueous solution of polystyrene sulfonic acid (manufactured by Tayca Corporation; the weight average molecular weight of 100,000) were put into a stainless steel vessel with a volume of 1 L, into which 0.3 g of ferrous sulfate with 7 hydrates were added. Then, 4 mL of ethylenedioxy thiophene (i.e., 3,4-ethylenedioxy thiophene;) was dropped slowly. Then, stirring was continued with a stirrer made of stainless steel. Electrolytic oxidation polymerization was performed in a constant current value of 1 mA/cm$^2$ for 18 hours at room temperature.

After the electrolytic oxidation polymerization as explained above, dilution was made with 6 times of water. Then, dispersion process was performed by using a ultrasonic wave homogenizer (US-T300 manufactured by Nippon Seiki Co., Ltd.) for 30 minutes. Then, 100 g of a cation-exchange resin AMBERLITE 120B (manufactured by Organo Corporation) was added, and stirring was continued for one hour.

Then, filtration was performed by using a filter paper, No. 131 made by Toyo Roshi Kaisha, Ltd. The processes with the cation-exchange resin and the filtration were repeated three times to remove ferrous ions in the liquid.

After removing the cationic components above, the liquid was applied to filtration by a filter with an aperture of 1 μm. The filtered liquid above was treated with an ultrafiltration device [VIVAFLOW 200 (product name) made by Sartorius Corporation, in a condition of a molecular weight fraction of 50,000], to remove free components of low molecular weights in the liquid. The pH value at this time was 2.7. Purified water was added in the liquid to adjust its concentration into 3%. With respect to 40 g of the 3% liquid, 4 g of dimethylsulfoxide (i.e., 333% by mass standard with respect to the conductive polymer) was added as a solvent having a high boiling point, to obtain Dispersion Liquid A of the conductive polymer.

Preparation Example B

Dispersion Liquid of the Conductive Polymer

Instead of ethylenedioxy thiophene, methylated ethylenedioxy thiophene was used. Except for the above, the same procedures as Preparation Example A to prepare the dispersion liquid of the conductive polymer were performed to prepare Dispersion Liquid B of the conductive polymer.

It is noted that the methylated ethylenedioxy thiophene as used above was synthesized as shown in the following Synthetic Example 1.

Synthetic Example 1

Synthesis of Methylated Ethylenedioxy Thiophene
(i.e., 2-methyl-2,3-dihydro-thieno[3,4-b][1,4]dioxin)

Through the following steps 1-(1) to 1-(3), methylated ethylenedioxy thiophene was synthesized.

1-(1): Synthesis of Propane-1,2-diyl-bis(4-methylbenzene sulfonate)

In iced water, 7.86 kg of tosyl chloride (40 mol) and 7 kg of 1,2-dichloroethane were put into a reaction vessel. Stirring was continued until the temperature in the vessel reached 10° C. 5.11 kg of triethylamine (50 mol) were dropped therein.

The mixture as mentioned above was stirred, while keeping attention of the temperature inside the vessel not to exceed 40° C. Into the mixture, 1.55 kg of 1,2-propanediol (20 mol) was dropped carefully for a period of 60 minutes. The mixture was stirred for six hours while keeping the temperature inside the vessel at 40° C.

The reaction completion liquid was cooled until room temperature. 4 kg of water was added while stirring. Then, it was kept still. The reaction completion liquid was divided into two phases, that is, water phase and organic phase. The organic phase was concentrated, thereby obtaining black-red oil substance.

In iced water, 500 g of methanol was put into a reaction vessel while stirring. Therein, the black-red oil substance was dropped while stirring. Then, white solids were precipitated, which were filtered. The white solids were washed with a small amount of methanol, and dried. As a result, 3.87 kg of propane-1,2-diyl-bis(4-methylbenzene sulfonate) were obtained as a product.
The yield was 50% by the solid content conversion.

1-(2): Synthesis of 2-methyl-2,3-dihydro-thieno[3,4-b][1,4]dioxine-5,7-dicarboxylic acid Into a reaction vessel, disodium-2,5-bis(alkoxycarbonyl) thiophene-3,4-diolate (508 g; 1.67 mol), propane-1,2-diyl-bis(4-methylbenzene sulfonate) obtained in Step 1-(1) above (960 g; 2.5 mol), potassium carbonate (46 g; 0.33 mol), and dimethylformamide (2.5 kg) were put. While keeping the temperature inside the vessel at 120° C., the mixture was stirred for four hours.

The reaction completion liquid is concentrated to leave brown solids, into which 3.7 kg of 5% sodium hydrogen carbonate aqueous solution were put, and stirring was continued at room temperature for 15 minutes. Then, brown solids were obtained by filtration. Into a reaction vessel, the filtered brown solids, and 7% aqueous sodium hydroxide (2.47 kg) were put. While keeping the temperature inside the vessel at 80° C., stirring was continued for two hours.

The vessel was cooled until its inside reached the room temperature. While keeping attention to the temperature inside the vessel not to exceed 30° C., 98% sulfuric acid (759 g) were carefully dropped into the reaction completion liquid. While keeping the temperature inside the vessel at 80° C., the stirring was continued for two hours.

The vessel was cooled while stirring until its inside reached the room temperature. Then, the precipitated gray solids were obtained by filtration. Furthermore, the reaction completion liquid was cooled to obtain gray solids by filtration. These gray solids were washed with a small amount of water, and dried. 310 g of 2-methyl-2,3-dihydro-thieno[3,4-b][1,4]dioxine-5,7-dicarboxylic acid were obtained as a product. The yield was 76% by the solid content conversion.

1-(3): Synthesis of methylated ethylenedioxy thiophene (i.e., 2-methyl-2,3-dihydro-thieno[3,4-b][1,4]dioxine)

2-methyl-2,3-dihydro-thieno[3,4-b][1,4]dioxine-5,7-dicarboxylic acid (880 g; 3.6 mol) as obtained in Step 1-(2) was dissolved in a reaction vessel with 3 kg of polyethylene glycol 300 (manufactured by Hayashi Pure Chemical Ind., Ltd.). Then, 176 g of copper oxide were added. The mixture was distilled at an internal pressure of 20 hpa, while gradually raising the temperature such that water and the first drop were distilled. Into the second drop including polyethylene glycol 300, 400 g of water were added with stirring. The mixture was kept still.

The liquids with two phases were divided. The lower phase was yellow transparence liquid, thereby obtaining 343 g of methylated ethylenedioxy thiophene as a product. The yield was 60%.

Preparation Example C

Dispersion Liquid of the Conductive Polymer 200 g of 3% sulfonated polyester aqueous solution [PLAS-COAT Z-561 (commercial name) manufactured by Goo Chemical Co., Ltd.; having a weight average molecular weight of 27,000] was put into a vessel with an internal volume of 1 L. After adding ammonium persulfate (2 g) as an oxidant, the mixture was stirred to be dissolved. Then, 0.4 g of 40% ferric sulfate aqueous solution was added. While stirring, ethylenedioxy thiophene (3 mL) was dropped slowly therein for 24 hours. As a result, chemical oxidation polymerization of ethylenedioxy thiophene was performed.

Into the reaction liquid after the chemical oxidation polymerization above, 100 g of cation-exchange resin AMBER-LITE 120B (commercial name) made by Organo Corporation were added, and the mixture was stirred for one hour. Then, filtration was performed by using a filter paper, No. 131 made by Toyo Roshi Kaisha, Ltd. The processes with the cation-exchange resin and the filtration were repeated three times to remove all of the cationic components such as iron ions in the liquid. Then, the liquid was concentrated with an ultrafiltration device [VIVAFLOW 200 (commercial name) made by Sartorius Corporation company, in a condition of a molecular weight fraction of 50,000]. The concentration of the aqueous system dispersion liquid of the conductive polymer was 3.0% when measured at the dry solid content under a condition of 105° C. With respect to 40 g of the 3% liquids, 4 g of dimethylsulfoxide (i.e., 333% by mass standard with respect to the conductive polymer) were added as a solvent having a high boiling point, thereby obtaining a dispersion liquid of the conductive polymer.

As prepared above, the dispersion liquid of the conductive polymer with sulfonated polyester as a dopant was mixed with Dispersion Liquid A of the conductive polymer with a dopant of polystyrene sulfonic acid prepared in Preparation Example A of the conductive polymer. The mass ratio of the mixing above was 1:5. As a result, the conductive polymer with polystyrene sulfonic acid as a dopant, and the conductive polymer with sulfonated polyester as a dopant were mixed into a mixture dispersion liquid, which became Dispersion Liquid C of the conductive polymer.

Preparation Example 1

To 100 g of distilled water, 3 g of p-hydroxybenzoic acid was added. Then, dimethylamine was added with stirring to completely dissolve p-hydroxybenzoic acid. The pH value at that time was 5.8. To the solution above, 1 g of butanediol was added. Here, the butanediol was added as a solvent having a high boiling point. The quantity of the addition was 33.3% with respect to p-hydroxybenzoic acid.

Preparation Example 2

To 100 g of distilled water, 0.5 g of p-hydroxybenzoic acid was added. Then, dimethylamine was added with stirring to completely dissolve p-hydroxybenzoic acid. The pH value at that time was 5.8. To the solution above, 1 g of butanediol was added.

Preparation Example 3

To 100 g of distilled water, 10 g of p-hydroxybenzoic acid was added. Then, dimethylamine was added with stirring to completely dissolve p-hydroxybenzoic acid. The pH value at that time was 5.8. To the solution above, 1 g of butanediol was added.

Preparation Example 4

To 100 g of distilled water, 3 g of p-hydroxybenzoic acid was added. Then, dimethylamine was added with stirring to completely dissolve p-hydroxybenzoic acid. Furthermore, dimethylamine was added therein, and the pH value was adjusted into 7.5. To the solution above, 1 g of butanediol was added.

Preparation Example 5

To 100 g of distilled water, 3 g of p-hydroxybenzoic acid was added. Then, dimethylamine was added with stirring to completely dissolve p-hydroxybenzoic acid. The pH value at that time was 5.8. To the solution above, 4 g of butanediol was added.

Preparation Example 6

To 100 g of distilled water, 3 g of p-hydroxybenzoic acid was added. Then, ammonia was added with stirring to completely dissolve p-hydroxybenzoic acid. The pH at that time was 5.9. To the solution above, 1 g of butanediol was added.

Preparation Example 7

To 100 g of distilled water, 3 g of p-hydroxybenzoic acid was added. Then, dimethylamine was added with stirring to completely dissolve p-hydroxybenzoic acid. The pH value at that time was 5.8. To the solution above, 1 g of butanediol was added. Furthermore, 1 g of 3-glycidoxypropyltrimethoxysilane was added. Here, the 3-glycidoxypropyltrimethoxysilane above was added as a binder. The quantity of the addition was 33.3% with respect to p-hydroxybenzoic acid.

Preparation Example 8

To 100 g of distilled water, 3 g of p-hydroxybenzoic acid was added. Then, dimethylamine was added with stirring to completely dissolve p-hydroxybenzoic acid. The pH value at that time was 5.8. To the solution, 1 g of butanediol was added. Furthermore, 1 g of polyethylene glycol diglycidyl ether was added. Here, the polyethylene glycol diglycidyl ether above was added as a binder.

Preparation Example 9

To 100 g of distilled water, 3 g of o-hydroxybenzoic acid was added. Then, dimethylamine was added with stirring to completely dissolve o-hydroxybenzoic acid. The pH value at that time was 5.8. To the solution above, 1 g of butanediol was added.

Preparation Example 10

To 100 g of distilled water, 3 g of o-hydroxybenzoic acid was added. Then, dimethylamine was added with stirring to completely dissolve o-hydroxybenzoic acid. The pH value at that time was 5.8. To the solution above, 1 g of butanediol was added. Furthermore, 1 g of 3-glycidoxypropyltrimethoxysilane was added.

Preparation Example 11

To 100 g of distilled water, 3 g of 1-hydroxy-3-naphthoic acid was added. Then, dimethylamine was added with stirring to completely dissolve 1-hydroxy-3-naphthoic acid. The pH value at that time was 5.8. To the solution, 1 g of butanediol was added. Furthermore, 1 g of polyethylene glycol diglycidyl ether was added.

Preparation Example 12

To 100 g of distilled water, 3 g of 1-hydroxy-3-naphthoic acid was added. Then, dimethylamine was added with stirring to completely dissolve 1-hydroxy-3-naphthoic acid. The pH value at that time was 5.8.

To the solution, 1 g of butanediol was added. Furthermore, 1 g of polyethylene glycol diglycidyl ether was added.

Preparation Example 13

To 100 g of distilled water, 3 g of p-hydroxybenzoic acid was added. Then, dimethylamine was added with stirring to completely dissolve p-hydroxybenzoic acid. The pH value at that time was 5.8. To the solution above, 1 g of dimethylsulfoxide was added. The dimethylsulfoxide mentioned above added it as solvent having a high boiling point.

Preparation Example 14

A 65% phenolsulfonic acid was diluted with distilled water to adjust its concentration into 5%. To this solution, dimethylamine was added while stirring to adjust its pH value into 5.8. Then, to 100 g of the solution, 1 g of butanediol was added.

Preparation Example 15

A 65% phenolsulfonic acid was diluted with distilled water to adjust its concentration into 5%. To this solution, dimethylamine was added while stirring to adjust its pH value into 5.8. Then, to 100 g of the solution, 1 g of dimethylsulfoxide was added.

Preparation Example 16

A 65% phenolsulfonic acid was diluted with distilled water to adjust its concentration into 5%. To this solution, ethylenediamine was added while stirring to adjust its pH value into 5.8. Then, to 100 g of the solution, 1 g of butanediol was added.

Preparation Example 17

A 65% phenolsulfonic acid was diluted with distilled water to adjust its concentration into 5%. To this solution, ethylenediamine was added while stirring to adjust its pH value into 5.8. Then, to 100 g of the solution, 1 g of butanediol is added. Furthermore, 1 g of 3-glycidoxypropyltrimethoxysilane was added.

Preparation Example 18

A 65% phenolsulfonic acid was diluted with distilled water to adjust its concentration into 5%. To this solution, ethylenediamine was added while stirring to adjust its pH value into 5.8. Then, to 100 g of the solution, 1 g of butanediol was added. Furthermore, 1 g of polyethylene glycol diglycidyl ether was added.

Preparation Example 19

Phenol was diluted with distilled water to adjust its concentration into 3%. Then, to 100 g of the solution, 1 g of butanediol was added. The pH of this solution was 4.2.

Preparation Example 20

Sulfosalicylic acid was diluted with distilled water to adjust its concentration into 5%. To this solution, dimethylamine was added while stirring to adjust its pH value into 5.8. Then, to 100 g of the solution, 1 g of butanediol was added.

Preparation Example 21

Naphtholsulfonic acid was diluted with distilled water to adjust its concentration into 5%. To this solution, dimethylamine was added while stirring to adjust its pH value into 5.8. Then, to 100 g of the solution, 1 g of butanediol was added.

Preparation Example 22

Nitrophenol was diluted with ethanol to adjust its concentration into 3%. Then, to 100 g of the solution, butanediol to be at an amount of 1% was added. The pH value of this solution was 3.9.

Preparation Example 23

Nitrophenol was diluted with ethanol to adjust its concentration into 3%. Then, to 100 g of the solution, butanediol was added to be at an amount of 1%. Furthermore, 3-glycidoxypropyltrimethoxysilane was added to be at an amount of 1%. The pH value of this solution was 3.9.

Preparation Example 24

Ethylhexyl p-hydroxybenzoate was diluted with ethanol to adjust its concentration into 3%. Then, to 100 g of the solution, 1 g of polyethylene glycol diglycidyl and 0.5 g of ethylene glycol were added. The pH value of this solution was 6.1.

Preparation Example 25

P-hydroxybenzoic acid was diluted with ethanol to adjust its concentration into 3%. Then, to 100 g of the solution, 1 g of polyethylene glycol diglycidyl and 0.5 g of ethylene glycol were added. The pH value of this solution was 3.7.

Preparation Example 26

P-hydroxybenzoic acid was diluted with ethanol to adjust its concentration into 2%. Then, to 100 g of the solution, 2 g of nitrophenol was added. Furthermore, 1 g of polyethylene glycol diglycidyl and 0.5 g of ethylene glycol were added. The pH value of this solution was 3.9.

Preparation Example 27

P-hydroxybenzoic acid was diluted with ethanol to adjust its concentration into 1%. Then, to 100 g of the solution, 4 g of nitrophenol was added. Furthermore, 1 g of polyethylene glycol diglycidyl and 0.5 g of ethylene glycol were added. The pH value of this solution was 3.9.

Preparation Example 28

P-hydroxybenzoic acid was diluted with ethanol to adjust its concentration into 2%. Then, 0.5 g of N-phenyl-γ-aminopropyltrimethoxysilane was added, and stirring was continued for eight hours. Then, to 100 g of the solution, 2 g of nitrophenol was added. Furthermore, 1 g of polyethylene glycol diglycidyl and 0.5 g of ethylene glycol were added. The pH value of this solution was 5.7.

Preparation Example 29 (For the Purpose of Comparative Example)

To 100 g of distilled water, 3 g of pyruvic acid was added. Then, dimethylamine was added with stirring to completely dissolve pyruvic acid. The pH value at that time was 5.8. To the solution above, 1 g of butanediol was added.

Preparation Example 30 (For the Purpose of Comparative Example)

To 100 g of distilled water, 3 g of pyruvic acid was added. Then, dimethylamine was added with stirring to completely dissolve pyruvic acid. The pH value at that time was 5.8. To the solution, 1 g of butanediol was added. Furthermore, 1 g of polyethylene glycol diglycidyl ether was added.

Preparation Example 31 (For the Purpose of Comparative Example)

To 100 g of distilled water, 3 g of isophthalic acid was added. Then, dimethylamine was added with stirring to completely dissolve isophthalic acid. The pH value at that time was 5.8. To the solution above, 1 g of butanediol was added.

Preparation Example 32 (For the Purpose of Comparative Example)

To 100 g of distilled water, 3 g of isophthalic acid was added. Then, dimethylamine was added with stirring to completely dissolve isophthalic acid. The pH value at that time was 5.8. To the solution, 1 g of butanediol was added. Furthermore, 1 g of polyethylene glycol diglycidyl ether was added.

Evaluation (1): Winding Type Aluminum Solid Electrolytic Capacitor

Example 1

In Example 1 as well as subsequent Examples 2-28, winding type aluminum solid electrolytic capacitors were produced, and their properties were evaluated. First, explanation is made as to the production of the winding type aluminum solid electrolytic capacitors.

The surface of an aluminum foil was etched to make it porous. The etched aluminum foil was immersed in a 12% adipic acid ammonium aqueous solution. A voltage of 120V was applied to the aluminum foil in the adipic acid ammonium aqueous solution to form a dielectric layer on the surface of the aluminum foil, to become a positive electrode. A lead terminal was attached to the positive electrode. Also, a lead terminal was attached to an aluminum foil to serve it as a negative electrode. The positive electrode and the negative electrode having the lead terminals were wound with interposition of a separator therebetween. Thereby, a capacitor element was produced for the purpose of production of a winding type aluminum solid electrolytic capacitor.

This capacitor element was immersed in Dispersion Liquid A of the conductive polymer which had been prepared in Preparation Example A of the conductive polymer. It was left there for five minutes, and then, it was taken out and dried at 150° C. for 30 minutes. Then, it was immersed in Dispersion Liquid A of the conductive polymer again, and then, it was taken out and dried at 150° C. for 30 minutes to form a conductive polymer layer.

Then, the capacitor element having formed the conductive polymer layer was immersed in the solution dissolving p-hydroxybenzoic acid which had been prepared in Preparation Example 1. It was left for one minute. Then, it was taken out, and dried at 150° C. for 30 minutes. Then, it was provided with an exterior material, thereby producing a winding type aluminum solid electrolytic capacitor.

Examples 2-28

The capacitor element for the purpose of production of a winding type aluminum solid electrolytic capacitor was provided in the same manner as Example 1. In the same manner as Example 1, it was immersed in Dispersion Liquid A of the conductive polymer which had been prepared in Preparation Example A of the conductive polymer, and then, it was taken out and dried. The sequential process above was repeated twice. Thereby, a conductive polymer layer was formed.

As described above, a necessary number of the capacitor elements, each having formed the conductive polymer layer, were prepared to be used in each Example. Each capacitor element was separately immersed in each solution as prepared in Preparation Examples 2-28, dissolving the cyclic organic compound having at least one hydroxyl group. After each was left for one minute, it was taken out and dried at 150° C. for 30 minutes. Then, an exterior material was provided, thereby obtaining winding type aluminum solid electrolytic capacitors of Examples 2-28.

Comparison Example 1

A capacitor element for the production of a winding type aluminum solid electrolytic capacitor was prepared in the same manner as Example 1. In the same manner as Example 1, it was immersed in Dispersion Liquid A of the conductive polymer prepared in Preparation Example A of the conductive polymer. Then, it was Taken out, and dried. The sequential process above was repeated twice to form a conductive polymer layer.

The capacitor element having formed the conductive polymer layer above was directly (in other words, without application to the dispersion treatment in the solution dissolving the cyclic organic compound having at least one hydroxyl group) applied to formation of an exterior material, thereby obtaining a winding type aluminum solid electrolytic capacitor of Comparative Example 1.

Comparative Examples 2-5

A capacitor element for the production of a winding type aluminum solid electrolytic capacitor was prepared in the same manner as Example 1. In the same manner as Example 1, it was immersed in Dispersion Liquid A of the conductive polymer prepared in Preparation Example A of the conductive polymer. Then, it was Taken out, and dried. The sequential process above was repeated twice to form a conductive polymer layer.

A necessary number of the capacitor elements, each having formed the conductive polymer layer above, were prepared for the purpose to be used in Comparative Examples. Each capacitor element was separately immersed in the solution which had prepared in each of Preparation Examples 29-32. Then, it was left for one minute, and taken out and dried at 150° C. for 30 minutes. An exterior material was provided to obtain a winding type aluminum solid electrolytic capacitor in accordance of each of Comparative Examples 2-5.

As explained above, the winding type aluminum solid electrolytic capacitors of Examples 1-28 and Comparative Examples 1-5 were prepared. Then, their properties of capacitance, ESR, leakage current and voltage resistance were measured. The results are shown in Tables 1 and 2. Here, the measurements of capacitance and ESR were made as follows. An LCR meter (4,284 A) made by HEWLETTPACKARD Corporation was used at a condition of 25° C. The capacitance was measured at 120 Hz, and the ESR was measured at 100 kHz. Also, the measurement of leakage current was made as follows. A rated voltage of 16V was applied to each winding type aluminum solid electrolytic capacitor at 25° C. for 60 seconds. Then, a digital oscilloscope was used to measure its leakage current. The measurement of voltage resistance was made by using PRk650-2.5 made by Matsusada Precision Inc., at a condition of 25° C. The break voltage was measured while raising the voltage at a speed of 1V/s. The measurements of capacitance and ESR were performed on 20 samples for each example. The numerical value shown in Table 1 is an average of the twenty samples. The number of decimal was rounded off to obtain the value of the capacitance. The number of the second decimal place was rounded off to obtain the value of the ESR. The measurement of the leakage current was performed on 20 samples for each. The leak current value shown in Table 1 etc. is an average of the twenties samples, such that the number of decimal was rounded off. The measurement of the voltage resistance was performed on five samples for each example. The resistance voltage shown in Table 1 etc. is an average of the five samples, such that the number of decimal was rounded off. Also, Table 1 indicates the solution dissolving the cyclic organic compound having at least one hydroxyl group, which is referred to as "solution" with the number of the Preparation Example for the purpose to reduce the space.

TABLE 1

| | solution | Capacitance (μF) | ESR (mΩ) | Leak current (HA) | Resistance voltage (V) |
|---|---|---|---|---|---|
| Ex. 1 | Pre. Ex. 1 | 51 | 14.9 | 9 | 88 |
| Ex. 2 | Pre. Ex. 2 | 51 | 16.7 | 9 | 87 |
| Ex. 3 | Pre. Ex. 3 | 51 | 16.0 | 9 | 87 |

TABLE 1-continued

| | solution | Capacitance (μF) | ESR (mΩ) | Leak current (HA) | Resistance voltage (V) |
|---|---|---|---|---|---|
| Ex. 4 | Pre. Ex. 4 | 51 | 16.0 | 10 | 89 |
| Ex. 5 | Pre. Ex. 5 | 51 | 15.1 | 8 | 89 |
| Ex. 6 | Pre. Ex. 6 | 51 | 15.0 | 9 | 87 |
| Ex. 7 | Pre. Ex. 7 | 51 | 14.4 | 9 | 97 |
| Ex. 8 | Pre. Ex. 8 | 51 | 14.0 | 9 | 96 |
| Ex. 9 | Pre. Ex. 9 | 51 | 15.7 | 10 | 88 |
| Ex. 10 | Pre. Ex. 10 | 51 | 15.1 | 9 | 95 |
| Ex. 11 | Pre. Ex. 11 | 51 | 15.8 | 12 | 85 |
| Ex. 12 | Pre. Ex. 12 | 51 | 15.1 | 9 | 91 |
| Ex. 13 | Pre. Ex. 13 | 51 | 14.9 | 9 | 86 |
| Ex. 14 | Pre. Ex. 14 | 51 | 14.7 | 14 | 85 |
| Ex. 15 | Pre. Ex. 15 | 51 | 14.8 | 13 | 86 |
| Ex. 16 | Pre. Ex. 16 | 51 | 14.5 | 15 | 85 |
| Ex. 17 | Pre. Ex. 17 | 51 | 14.3 | 13 | 94 |

TABLE 2

| | solution | Capacitance (μF) | ESR (mΩ) | Leak current (μA) | Resistance voltage (V) |
|---|---|---|---|---|---|
| Ex. 18 | Pre. Ex. 18 | 51 | 14.3 | 11 | 95 |
| Ex. 19 | Pre. Ex. 19 | 51 | 15.4 | 11 | 84 |
| Ex. 20 | Pre. Ex. 20 | 51 | 14.8 | 9 | 85 |
| Ex. 21 | Pre. Ex. 21 | 51 | 14.7 | 11 | 84 |
| Ex. 22 | Pre. Ex. 22 | 51 | 14.6 | 11 | 88 |
| Ex. 23 | Pre. Ex. 23 | 51 | 14.1 | 10 | 97 |
| Ex. 24 | Pre. Ex. 24 | 51 | 15.1 | 9 | 93 |
| Ex. 25 | Pre. Ex. 25 | 51 | 14.0 | 9 | 97 |
| Ex. 26 | Pre. Ex. 26 | 51 | 13.7 | 8 | 97 |
| Ex. 27 | Pre. Ex. 27 | 51 | 13.8 | 9 | 96 |
| Ex. 28 | Pre. Ex. 28 | 51 | 13.9 | 8 | 100 |
| Comp. Ex. 1 | None. | 51 | 18.8 | 10 | 78 |
| Comp. Ex. 2 | Pre. Ex. 29 | 49 | 23.1 | 21 | 67 |
| Comp. Ex. 3 | Pre. Ex. 30 | 49 | 22.3 | 8 | 76 |
| Comp. Ex. 4 | Pre. Ex. 31 | 49 | 25.7 | 21 | 64 |
| Comp. Ex. 5 | Pre. Ex. 32 | 49 | 25.4 | 10 | 76 |

Clearly understood from the results in Tables 1 and Table 2, the winding type aluminum solid electrolytic capacitors of Examples 1-28 (Hereinafter, the "winding type aluminum solid electrolytic capacitor" is simply referred to as "capacitor.") is excellent to those of Comparative Example 1-5, in that ESR is low (i.e., it is small), and voltage resistance was high such that the voltage resistance characteristics were superior.

Namely, the capacitors of Examples 1-28 were prepared through the immersion process into the solution dissolving the cyclic organic compound having at least one hydroxyl group. By contrast, the capacitor of Comparative Example 1 was produced without immersing it into such a solution; the capacitors of Comparative Examples 2-5 were prepared through the immersion process into a solution dissolving a compound other than the cyclic organic compound having at least one hydroxyl group. The results show that the Examples were superior to the Comparative Examples, in that ESR was low, and that the voltage resistance was high.

In addition, with respect to the winding type aluminum solid electrolytic capacitors of Examples 1-28 and Comparative Examples 1-5, the following test was performed. Using PRk650-2.5 and EL1.5 k-650V-LGob made by Matsusada Precision Inc., a charge discharge operation at 50V and 20 A for two seconds was repeated 10,000 times. Thereafter, the capacitance and ESR were measured to examine their charge discharge properties. The results are shown in Tables 3 and 4. Here, the measuring methods of the capacitance and the ESR were the same as before. The indication ways of the measured values in Tables 3 and 4 are the same as those in Tables 1 and 2. These notes are applied to Example 29 or subsequent examples.

TABLE 3

| | | After 10,000 times charge discharge operation | |
|---|---|---|---|
| | solution | Capacitance (μF) | ESR (mΩ) |
| Ex. 1 | Pre. Ex. 1 | 49 | 15.0 |
| Ex. 2 | Pre. Ex. 2 | 47 | 16.8 |
| Ex. 3 | Pre. Ex. 3 | 49 | 16.1 |
| Ex. 4 | Pre. Ex. 4 | 49 | 16.1 |
| Ex. 5 | Pre. Ex. 5 | 49 | 15.2 |
| Ex. 6 | Pre. Ex. 6 | 49 | 15.1 |
| Ex. 7 | Pre. Ex. 7 | 49 | 14.5 |
| Ex. 8 | Pre. Ex. 8 | 49 | 14.1 |
| Ex. 9 | Pre. Ex. 9 | 49 | 15.8 |
| Ex. 10 | Pre. Ex. 10 | 49 | 15.2 |
| Ex. 11 | Pre. Ex. 11 | 49 | 15.9 |
| Ex. 12 | Pre. Ex. 12 | 49 | 15.2 |
| Ex. 13 | Pre. Ex. 13 | 48 | 15.0 |
| Ex. 14 | Pre. Ex. 14 | 49 | 14.8 |
| Ex. 15 | Pre. Ex. 15 | 49 | 14.9 |
| Ex. 16 | Pre. Ex. 16 | 49 | 14.6 |
| Ex. 17 | Pre. Ex. 17 | 49 | 14.4 |

TABLE 4

| | | After 10,000 times charge discharge operation | |
|---|---|---|---|
| | solution | Capacitance (μF) | ESR (mΩ) |
| Ex. 18 | Pre. Ex. 18 | 49 | 14.4 |
| Ex. 19 | Pre. Ex. 19 | 48 | 15.6 |
| Ex. 20 | Pre. Ex. 20 | 49 | 14.9 |
| Ex. 21 | Pre. Ex. 21 | 49 | 14.8 |
| Ex. 22 | Pre. Ex. 22 | 49 | 14.7 |
| Ex. 23 | Pre. Ex. 23 | 49 | 14.2 |
| Ex. 24 | Pre. Ex. 24 | 48 | 15.3 |
| Ex. 25 | Pre. Ex. 25 | 50 | 14.1 |
| Ex. 26 | Pre. Ex. 26 | 50 | 13.8 |
| Ex. 27 | Pre. Ex. 27 | 50 | 13.9 |
| Ex. 28 | Pre. Ex. 28 | 50 | 14.0 |
| Comp. Ex. 1 | None. | 39 | 19.2 |
| Comp. Ex. 2 | Pre. Ex. 29 | 39 | 23.7 |
| Comp. Ex. 3 | Pre. Ex. 30 | 39 | 22.7 |
| Comp. Ex. 4 | Pre. Ex. 31 | 38 | 26.2 |
| Comp. Ex. 5 | Pre. Ex. 32 | 38 | 25.9 |

As shown in Tables 3 and 4, the capacitors of Examples 1-28, in comparison with the capacitors of Comparative Example 1-5, had a larger capacitance and a lower ESR.

In addition, when the capacitance values and the ESR values shown in Tables 3 and 4 are compared with the capacitance values and the ESR values shown in Tables 1 and 2, the followings are clearly understood. That is, the capacitors of Examples 1-28, in comparison with the capacitors of Comparative Example 1-5, showed less decrease of the capacitance and less increase of the ESR after repeating 10,000 times of the charge discharge operation. Therefore, the formers were superior to the latters in view of the charge discharge characteristics.

Namely, after repeating 10,000 times of the charge discharge operation, the capacitors of Comparative Examples 1-5 had a larger difference between the capacitance values and between the ESR values before and after the charge discharge operation, in comparison with the capacitors of Examples 1-28. These results show that the capacitors of Examples 1-28 were superior in the charge discharge properties to the capacitors of Comparative Examples 1-5.

Evaluation (2): Winding Type Aluminum Solid Electrolytic Capacitor

Examples 29-37 and Comparative Examples 6-8

Noted here is the difference from the description in the Section, "Evaluation (1): Winding type aluminum solid electrolytic capacitor." That is, Dispersion Liquid A of the conductive polymer used in the production of the winding type aluminum solid electrolytic capacitors was replaced with Dispersion Liquid B of the conductive polymer prepared in Preparation Example B of the dispersion liquid of the conductive polymer. Other than the above, the same procedures were used as described in the Section, "Evaluation (1): Winding type aluminum solid electrolytic capacitor," thereby producing winding type aluminum solid electrolytic capacitors. In addition, the capacitance, ESR, leakage current, and voltage resistance of these capacitors were measured. The results are shown in Table 5. However, in the Section of "Evaluation (2): Winding type aluminum solid electrolytic capacitor," the solutions of Preparation Examples 1, 7, 9-10, and 13-17 were used in the Examples. In the Comparative Examples, the solutions of Preparation Example 29-30 were used. Also, Comparative Example 6 did not apply any treatment using the solution.

TABLE 5

|  | Solution | Capacitance (μF) | ESR (mΩ) | Leak current (μA) | Resistance voltage (V) |
| --- | --- | --- | --- | --- | --- |
| Ex. 29 | Pre. Ex. 1 | 51 | 15.0 | 6 | 91 |
| Ex. 30 | Pre. Ex. 7 | 51 | 14.9 | 7 | 106 |
| Ex. 31 | Pre. Ex. 9 | 51 | 14.9 | 5 | 105 |
| Ex. 32 | Pre. Ex. 10 | 51 | 14.8 | 5 | 90 |
| Ex. 33 | Pre. Ex. 13 | 51 | 14.6 | 8 | 89 |
| Ex. 34 | Pre. Ex. 14 | 51 | 14.4 | 13 | 88 |
| Ex. 35 | Pre. Ex. 15 | 51 | 14.7 | 15 | 87 |
| Ex. 36 | Pre. Ex. 16 | 51 | 14.3 | 14 | 88 |
| Ex. 37 | Pre. Ex. 17 | 51 | 14.9 | 11 | 99 |
| Comp. Ex. 6 | None. | 51 | 19.0 | 9 | 79 |
| Comp. Ex. 7 | Pre. Ex. 29 | 49 | 24.5 | 21 | 69 |
| Comp. Ex. 8 | Pre. Ex. 30 | 49 | 22.9 | 8 | 78 |

As shown in Table 5, when the winding type aluminum solid electrolytic capacitors of Examples 29-37 (which is hereinafter referred to as "capacitor" for simplification) were compared with the capacitors of Comparative Examples 6-8, the following can be found. That is, the formers had a lower ESR, and higher voltage resistance, and therefore, the voltage resistance characteristics were superior to the latters.

Also, with respect to the winding type aluminum solid electrolytic capacitors of Examples 29-37 and Comparative Examples 6-8, the same procedures were applied as described in the Section, "Evaluation (1): Winding type aluminum solid electrolytic capacitor," to measure the capacitance and the ESR after repeating the charge discharge operation 10,000 times. The results are shown in Table 6.

TABLE 6

|  |  | After 10,000 times repetition of charge discharge operation | |
| --- | --- | --- | --- |
|  | Solution | Capacitance (μF) | ESR (mΩ) |
| Ex. 29 | Pre. Ex. 1 | 49 | 15.2 |
| Ex. 30 | Pre. Ex. 7 | 50 | 15.1 |
| Ex. 31 | Pre. Ex. 9 | 50 | 15.0 |
| Ex. 32 | Pre. Ex. 10 | 50 | 15.0 |
| Ex. 33 | Pre. Ex. 13 | 50 | 14.8 |
| Ex. 34 | Pre. Ex. 14 | 50 | 14.4 |
| Ex. 35 | Pre. Ex. 15 | 50 | 14.7 |
| Ex. 36 | Pre. Ex. 16 | 50 | 14.3 |
| Ex. 37 | Pre. Ex. 17 | 50 | 14.9 |
| Comp. Ex. 6 | None. | 38 | 20.1 |
| Comp. Ex. 7 | Pre. Ex. 29 | 39 | 25.2 |
| Comp. Ex. 8 | Pre. Ex. 30 | 39 | 23.3 |

As shown in Table 6, the capacitors of Examples 29-37 had a larger capacitance value, and a lower ESR value, than the capacitors of Comparative Examples 6-8.

Then, the capacitance values and the ESR values shown in Table 6 are compared with the capacitance values and the ESR values shown in Table 5. In the capacitors of Examples 29-37, even after repeating 10,000 times of the charge discharge operations, the decrease of the capacitance and the increase of the ESR are little. By contrast, in Comparative Examples 6-8, the capacitance values were greatly decreased after the repetition of the charge discharge, and the ESR values were increased. Therefore, it could be concluded that the capacitors of Examples 29-37 were superior in the charge discharge properties to the capacitors of Comparative Examples 6-8.

Evaluation (3): Winding Type Aluminum Solid Electrolytic Capacitor

Examples 38-46 and Comparative Examples 9-11

The same procedures were applied as described in the Section, "Evaluation (1): Winding type aluminum solid electrolytic capacitor," except for the following. That is, Dispersion Liquid A of the conductive polymer used in the production of the winding type aluminum solid electrolytic capacitor was replaced with Dispersion Liquid C (a mixture system dispersion liquid) of the conductive polymer prepared in Preparation Example C of the dispersion liquid of the conductive polymer. Other than the above change, the same procedures were applied as described in the Section, "Evaluation (1): Winding type aluminum solid electrolytic capacitor." Thereby, winding type aluminum solid electrolytic capacitors were produced. Then, the capacitance, ESR, leakage current, and voltage resistance of these capacitors were measured.

The results are shown in Table 7. However, in this "Evaluation (3): Winding-type aluminum solid electrolytic capacitor," the solutions of Preparation Examples 1, 7, 9, 10, and 13-17 were used as the Examples. In the Comparative Examples, the solutions of Preparation Examples 29-30 were used. Also, Comparative Example 9 did not include the process by using the solution.

TABLE 7

| | Solution | Capacitance (μF) | ESR (mΩ) | Leak current (μA) | Resistance voltage (V) |
|---|---|---|---|---|---|
| Ex. 38 | Pre. Ex. 1 | 51 | 14.6 | 9 | 90 |
| Ex. 39 | Pre. Ex. 7 | 51 | 14.2 | 10 | 100 |
| Ex. 40 | Pre. Ex. 9 | 51 | 14.1 | 8 | 101 |
| Ex. 41 | Pre. Ex. 10 | 51 | 14.7 | 8 | 89 |
| Ex. 42 | Pre. Ex. 13 | 51 | 14.5 | 9 | 90 |
| Ex. 43 | Pre. Ex. 14 | 51 | 14.5 | 19 | 88 |
| Ex. 44 | Pre. Ex. 15 | 51 | 14.4 | 22 | 87 |
| Ex. 45 | Pre. Ex. 16 | 51 | 14.2 | 17 | 89 |
| Ex. 46 | Pre. Ex. 17 | 51 | 13.9 | 16 | 97 |
| Comp. Ex. 9 | None. | 51 | 18.2 | 15 | 79 |
| Comp. Ex. 10 | Pre. Ex. 29 | 48 | 29.7 | 43 | 66 |
| Comp. Ex. 11 | Pre. Ex. 30 | 49 | 25.4 | 8 | 74 |

As shown in Table 7, the winding type aluminum solid electrolytic capacitors of Examples 38-46 (which can be hereinafter referred to as "capacitor"), in comparison with the capacitors of Comparative Examples 9-11, had a lower ESR value and a larger voltage resistance value, and therefore, the voltage resistance characteristics of the formers were superior to the latters.

Also, with respect to the winding type aluminum solid electrolytic capacitors of Examples 38-46 and Comparative Examples 9-11, the same procedures were applied as described in the Section, "Evaluation (1): Winding type aluminum solid electrolytic capacitor," to measure the capacitance and the ESR after repeating the charge discharge operation 10,000 times. The results are shown in Table 8.

TABLE 8

| | | After 10,000 times repetition of charge discharge operation | |
|---|---|---|---|
| | Solution | Capacitance (μF) | ESR (mΩ) |
| Ex. 38 | Pre. Ex. 1 | 50 | 14.7 |
| Ex. 39 | Pre. Ex. 7 | 50 | 14.4 |
| Ex. 40 | Pre. Ex. 9 | 50 | 14.2 |
| Ex. 41 | Pre. Ex. 10 | 50 | 14.8 |
| Ex. 42 | Pre. Ex. 13 | 50 | 14.6 |
| Ex. 43 | Pre. Ex. 14 | 50 | 14.6 |
| Ex. 44 | Pre. Ex. 15 | 50 | 14.5 |
| Ex. 45 | Pre. Ex. 16 | 50 | 14.3 |
| Ex. 46 | Pre. Ex. 17 | 50 | 14.0 |
| Comp. Ex. 9 | None. | 38 | 19.5 |
| Comp. Ex. 10 | Pre. Ex. 29 | 39 | 33.1 |
| Comp. Ex. 11 | Pre. Ex. 30 | 39 | 27.5 |

As shown in Table 8, the capacitors of Examples 38-46 had a larger capacitance value, and a lower ESR value, than the capacitors of Comparative Examples 9-11.

Then, the capacitance values and the ESR values shown in Table 8 are compared with the capacitance values and the ESR values shown in Table 7. In the capacitors of Example 38-46, even after repeating 10,000 times of the charge discharge operations, the decrease of the capacitance and the increase of the ESR were little. By contrast, in Comparative Example 9-11, the repetition of the charge discharge operations resulted in the significant decrease of the capacitance value, and the increase of the ESR value. In particular, the decrease of the capacitance value was significant. Therefore, it was concluded that the capacitors of Examples 38-46 were superior to the capacitors of Comparative Example 9-11 in view of the charge discharge properties.

THE FIELD OF INDUSTRIAL APPLICABILITY

According to the present invention, there can be provided a solid electrolytic capacitor in which the ESR is low, and the voltage resistance is high and the charge discharge properties are excellent.

What is claimed is:

1. A method for manufacturing a solid electrolytic capacitor using a conductive polymer for as a solid electrolyte, comprising:

providing a capacitor element including a porous body of a valve metal, and a dielectric layer of an oxide layer of the valve metal, wherein the valve metal is selected from the group consisting of aluminum, tantalum and niobium, carrying out at least one time a first sequential process to form a layer of a conductive polymer, the first sequential process comprising:

immersing the capacitor element in a first liquid of dispersion of a conductive polymer obtained by means of oxidation polymerization of thiophene or its derivative in the presence of a polymer anion as a dopant;

taking out the capacitor element from the first liquid; and drying the capacitor element;

subsequently, carrying out at least one time a second sequential process, the second sequential process comprising:

immersing the capacitor element in a second liquid which dissolves a cyclic organic compound having at least one hydroxyl group, the cyclic organic compound selected from the group consisting of hydroxybenzoic acid, hydroxynaphthoic acid and hydroxybenzoate alkyl having an alkyl group with a carbon number of 1 to 8;

taking out the capacitor element from the second liquid; and drying the capacitor element.

2. The method for manufacturing the solid electrolytic capacitor according to claim 1, wherein the polymer anion is a polymer sulfonic acid.

3. The method for manufacturing the solid electrolytic capacitor according to claim 2, wherein the polymer sulfonic acid is selected from the group consisting of polystyrene sulfonic acid, sulfonated polyester, and a phenolsulfonic acid novolac resin having a repeat unit represented by the formula (1) below;

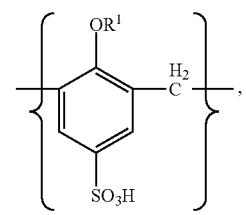

(1)

where in the formula (1), R1 is hydrogen or a methyl group.

4. The method for manufacturing the solid electrolytic capacitor according to claim 1, wherein the thiophene derivative is ethylenedioxy thiophene or alkyl derivative represented by formula (2) below;

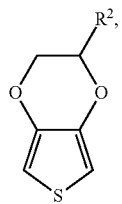

(2)

where in the formula, $R^2$ is hydrogen or an alkyl group.

5. The method for manufacturing the solid electrolytic capacitor according to claim 1, wherein said cyclic organic compound having at least one hydroxyl group further comprises at least one of carboxyl group and nitro group.

6. The method for manufacturing the solid electrolytic capacitor according to claim 1, wherein said second liquid which dissolves said cyclic organic compound having at least one hydroxyl group has a pH value of 1 to 11.

7. The method for manufacturing the solid electrolytic capacitor according to claim 1, wherein said cyclic organic compound having at least one hydroxyl group is selected from the group consisting of hydroxybenzoic acid, hydroxynaphthoic acid, phenolsulfonic acid, phenol, sulfosalicylic acid, naphtholsulfonic acid, nitrophenol and hydroxybenzoic acid ethylhexyl.

8. The method for manufacturing the solid electrolytic capacitor according to claim 1, wherein said second liquid which dissolves said cyclic organic compound having at least one hydroxyl group includes a solvent having a high boiling point.

9. The method for manufacturing the solid electrolytic capacitor according to claim 1, wherein said second liquid which dissolves said cyclic organic compound having at least one hydroxyl group includes a binder.

10. The method for manufacturing the solid electrolytic capacitor according to claim 1,
wherein the capacitor element comprises: a positive electrode and a negative electrode wound or laminated with interposition of a separator therebetween,
wherein the positive electrode comprises the porous body of the valve metal and the dielectric layer of the oxide layer of the valve metal, wherein the valve metal is selected from the group consisting of aluminum, tantalum and niobium, wherein at least one surface of the porous body has formed the dielectric layer.

11. The method for manufacturing the solid electrolytic capacitor according to claim 1, wherein the hydroxybenzoate alkyl is selected from the group consisting of hydroxybenzoic acid, hydroxynaphthoic acid, hydroxybenzoate methyl, hydroxybenzoate ethyl and hydroxybenzoate ethyl hexyl.

12. The method for manufacturing the solid electrolytic capacitor according to claim 2, wherein the hydroxybenzoate alkyl is selected from the group consisting of hydroxybenzoic acid, hydroxynaphthoic acid, hydroxybenzoate methyl, hydroxybenzoate ethyl and hydroxybenzoate ethyl hexyl.

* * * * *